(12) United States Patent
Nakano et al.

(10) Patent No.: US 7,215,392 B2
(45) Date of Patent: May 8, 2007

(54) ELECTRO-OPTICAL DEVICE, COLOR FILTER SUBSTRATE, METHOD OF MANUFACTURING ELECTRO-OPTICAL DEVICE, AND ELECTRONIC APPARATUS

(75) Inventors: Tomoyuki Nakano, Toyoshina-machi (JP); Keiji Takizawa, Toyoshina-machi (JP)

(73) Assignee: Seiko Epson Corporation (JP)

( * ) Notice: Subject to any disclaimer, the term of this patent is extended or adjusted under 35 U.S.C. 154(b) by 230 days.

(21) Appl. No.: 10/937,898

(22) Filed: Sep. 9, 2004

(65) Prior Publication Data

US 2005/0083453 A1    Apr. 21, 2005

(30) Foreign Application Priority Data

Sep. 10, 2003 (JP) ............................. 2003-318428

(51) Int. Cl.
    *G02F 1/1335* (2006.01)
(52) U.S. Cl. ...................................... 349/106; 349/114
(58) Field of Classification Search ................ 349/114, 349/113, 106
    See application file for complete search history.

(56) References Cited

U.S. PATENT DOCUMENTS

| | | | | |
|---|---|---|---|---|
| 6,124,909 | A * | 9/2000 | Miyashita et al. ............ | 349/109 |
| 6,215,538 | B1 * | 4/2001 | Narutaki et al. .............. | 349/106 |
| 6,452,654 | B2 * | 9/2002 | Kubo et al. ................... | 349/114 |
| 6,501,521 | B2 * | 12/2002 | Matsushita et al. ........... | 349/106 |
| 6,885,418 | B2 * | 4/2005 | Matsushita et al. ........... | 349/113 |
| 6,909,479 | B2 * | 6/2005 | Iijima .......................... | 349/109 |
| 6,999,139 | B2 * | 2/2006 | Kim et al. .................... | 349/106 |
| 6,999,143 | B2 * | 2/2006 | Fukuchi ....................... | 349/114 |
| 7,030,946 | B2 | 4/2006 | Iijima et al. | |
| 2003/0122998 | A1 * | 7/2003 | Iijima et al. ................. | 349/106 |
| 2004/0095528 | A1 * | 5/2004 | Nakamura et al. ........... | 349/106 |
| 2004/0183971 | A1 * | 9/2004 | Fukuchi ....................... | 349/114 |
| 2004/0246414 | A1 * | 12/2004 | Iijima et al. ................. | 349/114 |
| 2005/0036086 | A1 * | 2/2005 | Kim et al. .................... | 349/106 |
| 2005/0057711 | A1 * | 3/2005 | Chang et al. ................ | 349/114 |
| 2005/0110923 | A1 * | 5/2005 | Yamashita et al. ........... | 349/107 |
| 2006/0028599 | A1 * | 2/2006 | Fukuchi ....................... | 349/114 |
| 2006/0103794 | A1 * | 5/2006 | Iijima et al. ................. | 349/114 |
| 2006/0132685 | A1 * | 6/2006 | You ............................. | 349/114 |

FOREIGN PATENT DOCUMENTS

| | | |
|---|---|---|
| JP | 2002-221319 | 8/2002 |
| JP | 2003-177397 | 6/2003 |
| JP | 2003-186000 | 7/2003 |

OTHER PUBLICATIONS

Communication from Korean Patent Office re: related application.

* cited by examiner

*Primary Examiner*—James A. Dudek
(74) *Attorney, Agent, or Firm*—Harness, Dickey & Pierce, P.L.C.

(57) ABSTRACT

A transflective liquid crystal device is provided that has red, green and blue colored layers provided in correspondence with a plurality of dot portions, and reflective layers overlapping the colored layers in plan view. In the plurality of dot portions, transparent bank layers and colored layers arranged to fill regions defined by the bank layers are respectively provided, and the forming areas of the bank layers in the respective dot portions are different from each other such that the forming areas of the colored layers in the respective dot portion are different for each color.

11 Claims, 13 Drawing Sheets

(a)

(b)

ELECTRO-OPTICAL DEVICE, COLOR FILTER SUBSTRATE, METHOD OF MANUFACTURING ELECTRO-OPTICAL DEVICE, AND ELECTRONIC APPARATUS

RELATED APPLICATIONS

This application claims priority to Japanese Patent Application No. 2003-318428 filed Sep. 10, 2003 which is hereby expressly incorporated by reference herein in its entirety.

BACKGROUND

1. Technical Field

The present invention relates to an electro-optical device, a color filter substrate, a method of manufacturing the electro-optical device, and an electronic apparatus.

2. Background Art

A transflective liquid crystal device as an electro-optical device which combines a reflection type and a transmission type can be switched into one of a reflective display mode and a transmissive display mode according to the surrounding luminosity. In such a liquid crystal device, a reflective layer comprising a reflective portion for reflecting external light and a transmissive portion formed of an opening of a reflective film for every pixel is provided. Thus, when the illuminating means is turned on, illuminating light passes through the transmissive portion of the reflective layer to perform transmissive display. Further, when the illuminating means is turned off, external light is reflected by the reflective portion of the reflective layer to perform reflective display.

In the transflective liquid crystal device, in order to realize color display, a color filter substrate in which colored layers of red (R), green (G), blue (B) and so on are arranged on the observation side of the reflective layer (external light incident side) is used. The colored layers are formed, for example, using an inkjet method (for example, see Japanese Unexamined Patent Application Publication No. 2002-221319 (Paragraphs [0031] through [0052] and FIG. 1)).

In such a transflective liquid crystal device, in the transmissive display, illuminating light transmitting the transmissive portions of the respective pixels passes through the colored layers once, while in the reflective display, external light is reflected by the reflective portions of the respective pixels and then passes through the colored layers two times in a round trip. Therefore, in the case that the transmissive display and the reflective display use the common colored layers, there is a problem in that chroma or luminosity of display images in the respective displays is lacking. That is, if the colored layers having low pigment concentrations are used so as to obtain the optimum chroma in the reflective display, the chroma of display images becomes insufficient in the transmissive display. Meanwhile, if the colored layers having high pigment concentrations are used so as to obtain the optimum chroma in the transmissive display, the luminosity of display images becomes insufficient in the reflective display.

In consideration of the above problems, it is an object of the present invention to provide a transflective liquid crystal device in which a color display having an excellent color balance can be realized in the transmissive display or the reflective display.

SUMMARY

In order to solve the problems, an electro-optical device of the present invention comprises: colored layers having plural colors provided in correspondence with a plurality of dot portions; and a reflective layer overlapping the colored layers in plan view, wherein in the plurality of dot portions, transparent layers and the colored layers arranged to fill regions divided by the transparent layers are respectively provided, and forming areas of the transparent layers in the respective dot portions are different from each other such that the forming areas of the colored layers in the respective dot portions are different from each other for every color.

According to such a configuration of the present invention, it is possible to obtain a luminous reflective display by providing the transparent layers. In addition, the forming areas of the transparent layers are different from each other for every color of the colored layers, such that it is possible to voluntarily change a color balance in the reflective display. Therefore, in the reflective display, it is possible to adjust the color balance such that optimum luminosity for every color may be obtained, and thus it is possible to obtain an electro-optical device which has a display property exhibiting an excellent white balance.

Further, the colored layers may be made of a droplet material.

In such a manner, it is possible to form the colored layers made of a droplet material using an inkjet method, and thus it is possible to prevent a color mixture of the adjacent colored layers having different colors by providing the transparent layers.

Further, the respective dot portions may have transmissive portions and reflective portions in which the reflective layer is formed. In addition, the colored layers may be arranged in the respective transmissive portions, and the transparent layers and the colored layers may be arranged in the respective reflective portions.

In such a manner, the present invention can also be applied to a transflective electro-optical device, and thus it is possible to obtain an electro-optical device which has a reflective display property exhibiting an excellent white balance.

Further, the colored layers may be colored red, green, and blue, and a ratio of the forming areas of the transparent layers may be red:green:blue=1.1 to 1.3:1.3 to 2.5:1.

Since the ratio of the forming areas of the transparent layers is set in such a manner, it is possible to obtain an electro-optical device which has a display property exhibiting a good chromaticity property.

Another electro-optical device of the present invention comprises: colored layers having plural colors provided in correspondence with a plurality of dot portions; a reflective layer overlapping the colored layers in plan view; and transmissive portions and reflective portions in which the reflective layer is formed for the respective dot portions. The respective dot portions have colored layer regions in which the colored layers are provided and non-colored regions in which the colored layers are not provided. The colored layer regions are arranged in the transmissive portions of the respective dot portions, and the corresponding non-colored regions and the colored layer regions are arranged in the reflective portions of the respective dot portions. The areas of the non-colored regions in the respective dot portions are different from each other for every color of the colored layers.

According to such a configuration of the present invention, the areas of the non-colored regions in the respective dot portions are different from each other for every color of the colored layers, and thus it is possible to voluntarily change a color balance in the reflective display. Therefore, in the reflective display, it is possible to adjust the color balance such that the optimum luminosity may be obtained for every color, and thus it is possible to obtain an electro-optical device which has a display property exhibiting an excellent white balance.

Further, the areas of the transmissive portions are different from each other for every color of the colored layers.

According to such a configuration, since the areas of the transmissive portions are different from each other for every color, the amount of light from a light source provided in an electro-optical device for the transmissive display can be adjusted for every color, and further it is possible to change the color balance in the transmissive display. Therefore, when color balances in the transmissive display and the reflective display are different from each other, it is possible to voluntarily set the optimum balances in the transmissive display and the reflective display by changing the color balances of the transmissive display and the reflective display, and thus an electro-optical device having a desired color display property can be obtained.

Further, the colored layers may be colored red, green, and blue, and a ratio of areas of the transmissive portions may be red:green:blue=1 to 1.2:1:1 to 1.5.

In such a manner, the ratio of the areas of the transmissive portions for the respective colors is set, and thus it is possible to obtain an electro-optical device which has a transmissive display property exhibiting a good color property.

A color filter substrate of the present invention comprises: colored layers having plural colors provided in correspondence with a plurality of dot portions; and a reflective layer overlapping the colored layers in plan view, wherein in the plurality of dot portions, transparent layers and the colored layers arranged to fill regions divided by the transparent layers are respectively provided. The forming areas of the transparent layers in the respective dot portions are different from each other such that forming areas of the colored layers in the respective dot portions are different for every color.

In an electro-optical device comprising such a color filter substrate of the present invention, it is possible to obtain the luminous reflective display by providing the transparent layers. In addition, the forming areas of the transparent layers are different from each other for every color of the colored layers, and thus it is possible to voluntarily change a color balance in the reflective display. Therefore, in the reflective display, it is possible to adjust the color balance such that the optimum luminosity may be obtained for every color, and thus it is possible to obtain an electro-optical device which has a display property exhibiting an excellent white balance.

Further, the color filter substrate may further comprise a reflective layer overlapping the colored layers in plan view.

In such a manner, the present invention can also be applied to a transflective liquid crystal device, and thus it is possible to obtain an electro-optical device which has a reflective display property exhibiting an excellent white balance.

Another color filter substrate of the present invention comprises: colored layers having plural colors provided in correspondence with a plurality of dot portions; a reflective layer overlapping the colored layers in plan view; and transmissive portions and reflective portions in which the reflective layer is formed in the respective dot portions. The respective dot portions have colored layer regions in which the colored layers are provided and non-colored regions in which the colored layers are not provided. The colored layer regions are arranged in the transmissive portions of the respective dot portions, and the corresponding non-colored regions and the colored layer regions are arranged in the reflective portions of the respective dot portions. The areas of the non-colored regions in the respective dot portions are different from each other for every color of the colored layers.

In an electro-optical device comprising such a color filter substrate of the present invention, the areas of the non-colored regions in the respective dot portions are different from each other for every color of the colored layers, and thus it is possible to voluntarily change a color balance in the reflective display. Therefore, in the reflective display, it is possible to adjust the color balance such that the optimum luminosity may be obtained for every color, and thus it is possible to obtain an electro-optical device which has a display property exhibiting an excellent white balance.

There is provided a method of manufacturing an electro-optical device of the present invention comprising colored layers having plural colors provided in correspondence with a plurality of dot portions, the method comprising: a step of forming transparent layers on a substrate such that the areas of the transparent layers in the plurality of dot portions are different from each other for every color, so as to divide at least a part of the dot portions; and a step of forming the colored layers in regions divided by the transparent layers.

In an electro-optical device manufactured by such a manufacturing method of the present invention, it is possible to obtain a luminous reflective display by providing transparent layers. In addition, since the forming areas of the transparent layers are different from each other for every color of the colored layers, it is possible to voluntarily change a color balance in the reflective display. Therefore, in the reflective display, it is possible to adjust the color balance such that the optimum luminosity may be obtained for every color, and thus it is possible to obtain an electro-optical device which has a display property exhibiting an excellent white balance. Further, it is possible to perform the formation of the colored layers by means of an inkjet method by providing the transparent layers.

Further, the manufacturing method may further comprise a step of forming a reflective layer having transmissive portions and reflective portions in correspondence with the respective dot portions. The reflective layer may be formed such that planar areas of the transmissive portions are different from each other for every color.

In such a manner, the reflective layer having a transflective function can be formed on the same substrate as the colored layers. Further, according to an electro-optical device manufactured by such a manufacturing method, since the planar areas of the transmissive portions are different from each other for every color, in the transmissive display, it is possible to adjust the amount of light from a light source provided in an electro-optical device for every color, and further it is possible to change an optimum color balance in the transmissive display. Therefore, when color balances in the transmissive display and the reflective display are different from each other, it is possible to voluntarily set the optimum balances in the transmissive display and the reflective display by changing the color balances of the transmissive display and the reflective display, and thus an electro-optical device having a desired color display property can be obtained.

An electronic apparatus of the present invention comprises an electro-optical device described above. The electronic apparatus includes cellular phones, personal digital assistants, electronic wristwatches and so on.

As described above, according to the present invention, the planar areas of the transparent layers are different from each other for every colored layer, and thus it is possible to voluntarily change a color balance in the reflective display. Further, in the reflective display, it is possible to adjust the color balance such that the optimum luminosity may be obtained for every color, and thus it is possible to obtain an electro-optical device which has a display property exhibiting an excellent white balance.

DETAILED DESCRIPTION

Next, examples of a color filter substrate, a method of manufacturing the color filter substrate, an electro-optical device, and an electronic apparatus according to the present invention will now be described with reference to the accompanying drawings. In the examples, an example in which a liquid crystal device is constructed as the electro-optical device will now be described.

Figure 1:
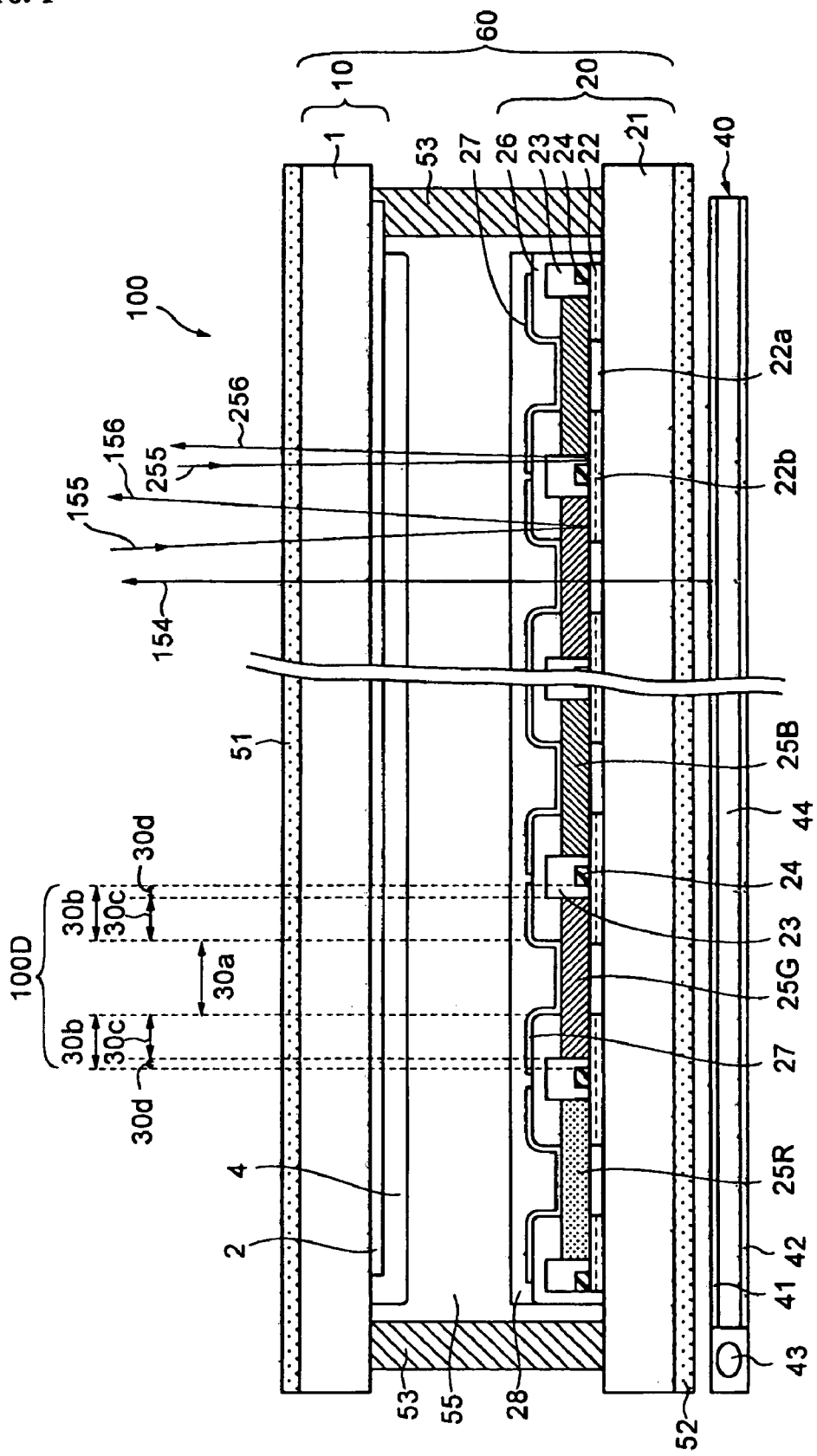
FIG. 1 is a schematic cross-sectional view of a liquid crystal device of an embodiment of the present invention.

FIG. 1 is a schematic cross-sectional view of a liquid crystal device as an electro-optical device into which a color filter substrate of an example 1 according to the present invention is incorporated, whose detailed structure will be described later.

A liquid crystal device 100 shown in FIG. 1 has a transflective mode simple matrix type structure.

The liquid crystal device 100 has a liquid crystal panel 60 and a backlight 40 arranged adjacent to the liquid crystal panel 60. The liquid crystal panel 60 has a counter substrate 10, a color filter substrate 20, a sealing material 53 for bonding both the substrates 10 and 20, a liquid crystal layer 55 interposed between the substrates 10 and 20, and a pair of polarizing plates 51 and 52 with both the substrates 10 and 20 interposed therebetween.

The backlight 40 has a light source 43, a light guiding plate 44, a diffusion plate 41, and a reflective plate 42. The light guiding plate 44 guides light emitted from the light source 43 to the entire surface of the liquid crystal panel 60, and the diffusion plate 41 uniformly diffuses light guided by the light guiding plate 44 to the liquid crystal panel 60. The reflective plate 42 reflects light emitted from the light guiding plate 44 to an opposite side to the liquid crystal panel 60 toward the liquid crystal panel 60. Here, the light source 43 is not turned on constantly. When the liquid crystal device is used under circumstances in which little external light exists, the light source is turned on according to instructions from a user or detection signals from a sensor, such that a transmissive display is performed.

As shown in FIG. 1, the counter substrate 10 has a glass substrate 1, first electrodes 2 made of a transparent material, such as ITO, which are arranged in a stripe shape on the glass substrate 1, and an alignment film 4 for covering the first electrodes 2. The alignment film 4 is an organic thin film made of polyimide and the like, and a rubbing process is performed thereon.

Meanwhile, the color filter substrate 20 is constructed by sequentially depositing a reflective layer 22, a lattice-shaped light-shielding layer 24, a bank layer 23 as a transparent layer, a colored layer 25, an overcoat layer 26, second electrodes 27 made of a transparent material, such as ITO, and an alignment film 28 on a glass substrate 21. The reflective layer 22 is composed of a reflective film, such as an aluminum (Al) film, and has transmissive portions 22a formed of openings and reflective portions 22b. The detailed structure of the color filter substrate 20 will be described later.

In the liquid crystal device 100 of the present example, a dot portion is constructed by the first electrode 2, the second electrode 27, and the liquid crystal layer 55 in correspondence with the intersections of the first and second electrodes 2 and 27. Display is performed by optically changing the liquid crystal layer 55 of each dot portion. In the liquid crystal device 100, when the amount of external light is sufficient, reflective display is performed. On the other hand, when the amount of external light is insufficient, transmissive display is performed.

In the present example, as seen from a direction orthogonal to the substrate, the liquid crystal device 100 is configured such that a circumferential end of each of intersecting portions at which the first electrodes 2 and the second electrodes 27 overlap with each other in plan view is disposed on the light-shielding layer 24. The respective dot portions 100D are regions divided by the light-shielding layer 24, and in the present example, regions that actually contribute to display correspond to the dot portions. Each dot portion 100D has a transmissive region 30a and a reflective region 30b. The reflective region 30b has a colored layer region 30c in which a colored layer is arranged and a bank layer region 30d in which a transparent bank layer is arranged. The transmissive region 30a corresponds to the transmissive portion 22a of the reflective layer 22, and the reflective region 30b corresponds to the reflective portion 22b of the reflective layer 22.

As shown in FIG. 1, in the liquid crystal device 100, when reflective display is preformed, an external light component 155 or 255, such as natural light or room illumination, incident on the liquid crystal device 100 passes through the counter substrate 10, the colored layer 25 or the bank layer to be reflected by the reflective portion 22b of the reflective layer 22, and reflected light 156 or 256 is emitted to the outside again through the colored layer 25 or the bank layer 23, the liquid crystal layer 55, and the counter substrate 10. The reflected light 156 reaches the outside of the liquid crystal device 100 as colored reflected light. The reflected light 256 reaches the outside of the liquid crystal device 100 as non-colored, luminous reflected light. In such a manner, in the respective dot portions 100D, since the transparent bank layers 23 are provided so as to overlap with a part of the reflective portions 22b of the reflective layer 22 in plan view, the non-colored, luminous reflected light is emitted. Therefore, it is possible to supplement a lack of luminosity of the reflected light in the entire reflective region by means of the reflected light 256.

Meanwhile, when transmissive display is performed, the light 154 emitted from the backlight 40 is colored by the colored layer 25 while passing through the liquid crystal panel 60, and the colored light is then emitted to the outside of the liquid crystal device 100.

The color filter substrate that is incorporated into the above-mentioned liquid crystal device will now be described.

EXAMPLE 1

The color filter substrate 20 in example 1, which is incorporated into the above-mentioned liquid crystal device 100, will now be described in detail with reference to FIGS. 2 and 3.

Figure 2:
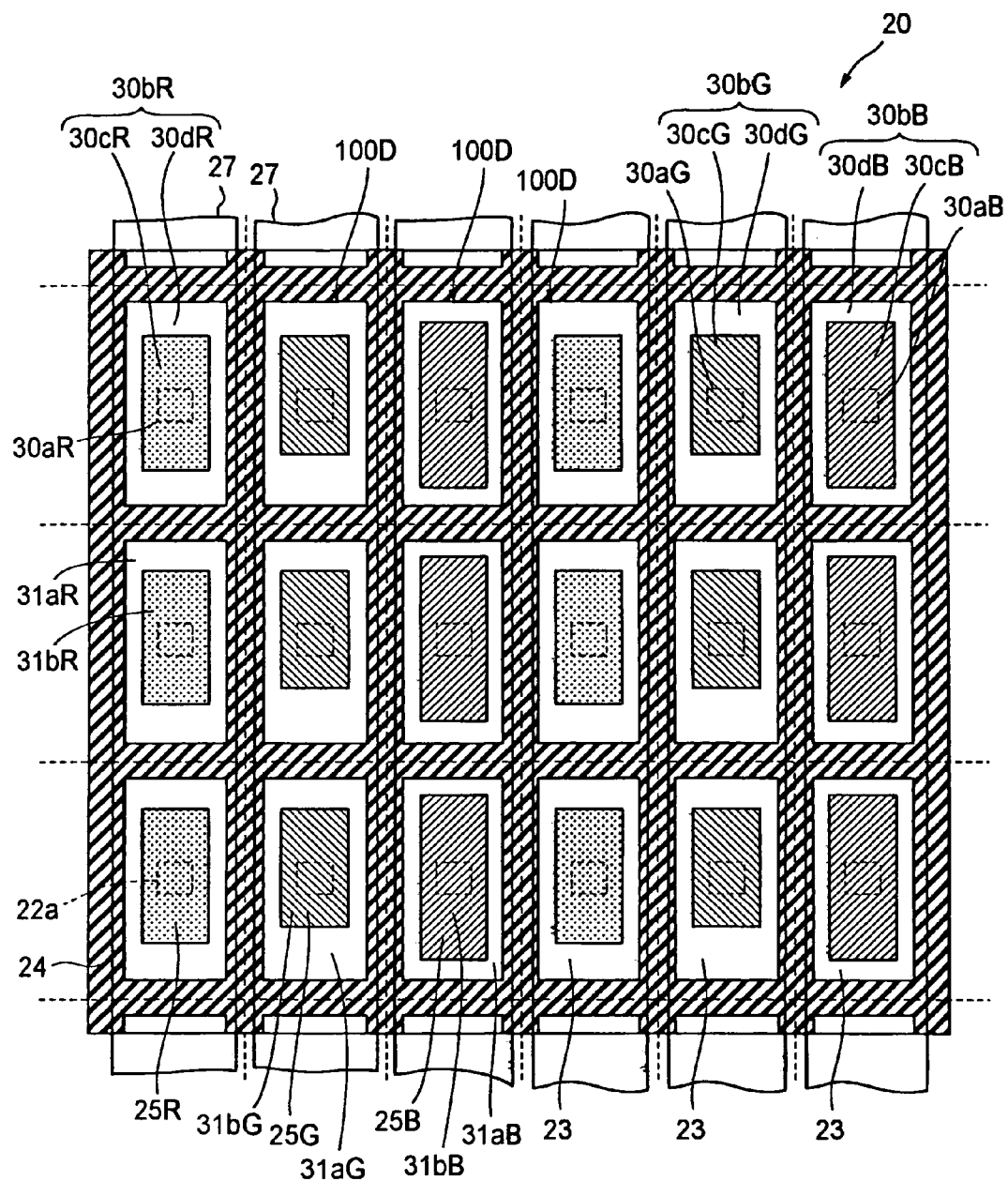
FIG. 2 is a partial plan view schematically illustrating a color filter substrate of example 1.

FIG. 2 is a partial schematic plan view of the color filter substrate 20 constituting a part of the liquid crystal device 100. FIG. 3(a) is a partial schematic plan view of FIG. 2, which corresponds to one pixel. FIG. 3(b) is a cross-sectional view taken along the line A–A' of FIG. 3(a), in which an alignment film is not shown.

As shown in FIG. 2, the color filter substrate 20 includes a plurality of dot portions 100D. In a state in which the color filter substrate 20 is incorporated into the liquid crystal device 100, the respective dot portions 100D are formed in correspondence with the positions at which the second electrodes 27 and the first electrodes 2 on the counter substrate 10 opposite to the second electrodes 27 overlap with each other in plan view. Each of the dot portions 100D correspond to one of R (red), G (green), and B (blue), and in the example of FIG. 2, the dot portions 100D having the same color are arranged in a vertical direction. In FIG. 2, one pixel is composed of three dot portions 100D of R, G, and B that are arranged repetitively in a horizontal direction.

Figure 3:
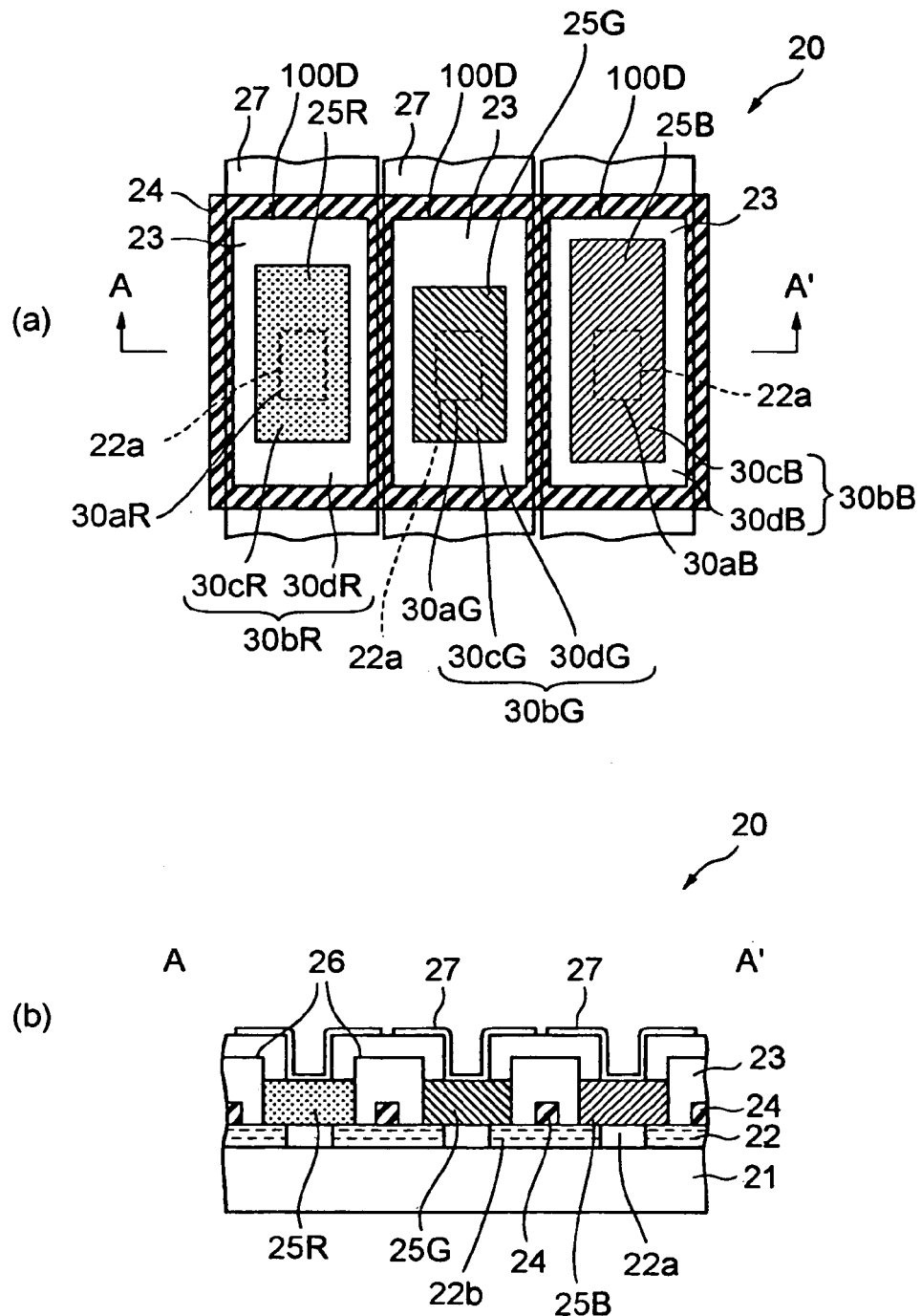
FIGS. 3(a) and 3(b) are a plan view and a cross-sectional view corresponding to one pixel in example 1.

As shown in FIGS. 2 and 3, the reflective layer 22 has the reflective portions 22b and the transmissive portions 22a. The transmissive portions 22a are opening portions in which a reflective film made of Al and the like are not formed. The opening portion, which is the transmissive portion 22a, is formed in every dot portion 100D. The light-shielding layer 24 is made of black resin, and is formed in a lattice shape so as to divide almost all of the dot portions 100D. Within a region to be surrounded by adjacent bank layers 23, a colored layer 25 having one of the colors R, G and B is formed by means of an inkjet method as described below. The bank layer 23 is made of an acryl photosensitive resin and the like which is transparent and has an ink-repellent property, and serves to prevent the mixture of inks (a droplet material) constituting the adjacent colored layers 25 when the colored layers 25 are formed by means of an inkjet method (a film-forming method by means of the ejection of a droplet material).

The overcoat layer (a protective film) 26 is made of transparent resin, such as an acryl resin. Since the liquid crystal device 100 of the present example adopts a multi-gap structure, the overcoat layer 26 is not formed on the colored layers 25 in regions corresponding to the transmissive portions 22a of the reflective layer 22. Thus, it is possible to adjust the thickness of the liquid crystal layer in transmissive display regions and reflective display regions to design an enhancement in luminosity or color tone of display.

As described above, in the color filter substrate 20 of the present example, after it is incorporated into the liquid crystal device 100, regions that actually contribute to display correspond to the dot portions 100D. In FIGS. 2 and 3(a), a region filled with a diagonal going upwards from the left to the right is a forming region of the light-shielding layer 24, and the bank layer 23 is formed in the regions filled with a diagonal going upwards from the left to the right and blank regions. The bank layer 23 is formed to have a width wider than that of the light-shielding layer 24 so as to cover the light-shielding layer 24. In the region in which the bank layer 23 is formed, the colored layers 25 are not formed. Thus, as shown in FIGS. 2 and 3, each dot portion 100D has a bank layer region 31a as a transparent layer, which is made of a frame-shaped bank layer 23, and a colored layer region 31b, which is constructed by arranging the colored layer 25 in the bank layer region 31a. A region corresponding to the transmissive portion 22a of the colored layer region 31b is a transmissive region 30a to be used for transmissive display, and other portions of the colored layer region 31a and the bank layer region 31b correspond to the reflective region 30b to be used for reflective display. That is, only the colored layer 25 is arranged in the transmissive region 30a, and the colored layer 25 and the bank layer 23 are arranged in the reflective region 30b.

In the present example, planar forming areas of the respective dot portions 100D and planar forming areas of the transmissive regions 30a (that is, the transmissive portions 22a of the reflective layer 22) corresponding to the respective colors are the same, and planar forming areas of the bank layer regions 31a for the respective colors are different from each other. In other words, in the dot portions 100D divided by the light-shielding layer 24, the planar forming areas of the bank layers 23 for the respective colors are different from each other. More specifically, in the respective dot portions 100D, the ratio of the forming areas of the bank layers 23 for the respective colors is set to be red: green: blue=1.1 to 1.3:1.3 to 2.5:1.

In the color filter substrate of the present example, the pigment concentration of the colored layer 25 is set such that the transmitted light 154 (see FIG. 1) passing through the transmissive region exhibits the optimum chroma. Therefore, the reflected light 156 shows a tendency that luminosity is lacking since it passes through the colored layer 25 twice which is optimally set with respect to the transmitted light. However, in a region of the reflective region other than the light-shielding layer 24 within a region in which the bank layer 23 is formed, the external light 255 is reflected by the reflective layer 22, without passing through the colored layer 25, and is then emitted as non-colored, luminous reflected light 256. Thus the lack of luminosity of the reflected light in the entire reflective region can be supplemented by the reflected light 256.

The planar areas of the bank layers 31a are determined in consideration of luminosity that the entire reflective region needs. Herein, the optimum values for the respective colors are different from each other. In the present example, by setting the planar forming areas of the bank layer regions 31a corresponding to the reflective portions 22b as described above, it is possible to obtain the optimum luminosity for every color, and further it is possible to obtain a color filter substrate which has a color property exhibiting a good white balance. A transflective liquid crystal device comprising such a color filter substrate has a luminous reflective display property exhibiting a good chromaticity property.

Next, a manufacturing method of the above-mentioned color filter substrate shown in FIG. 1 will be described with reference to the FIGS. 10 and 11.

Figure 10:
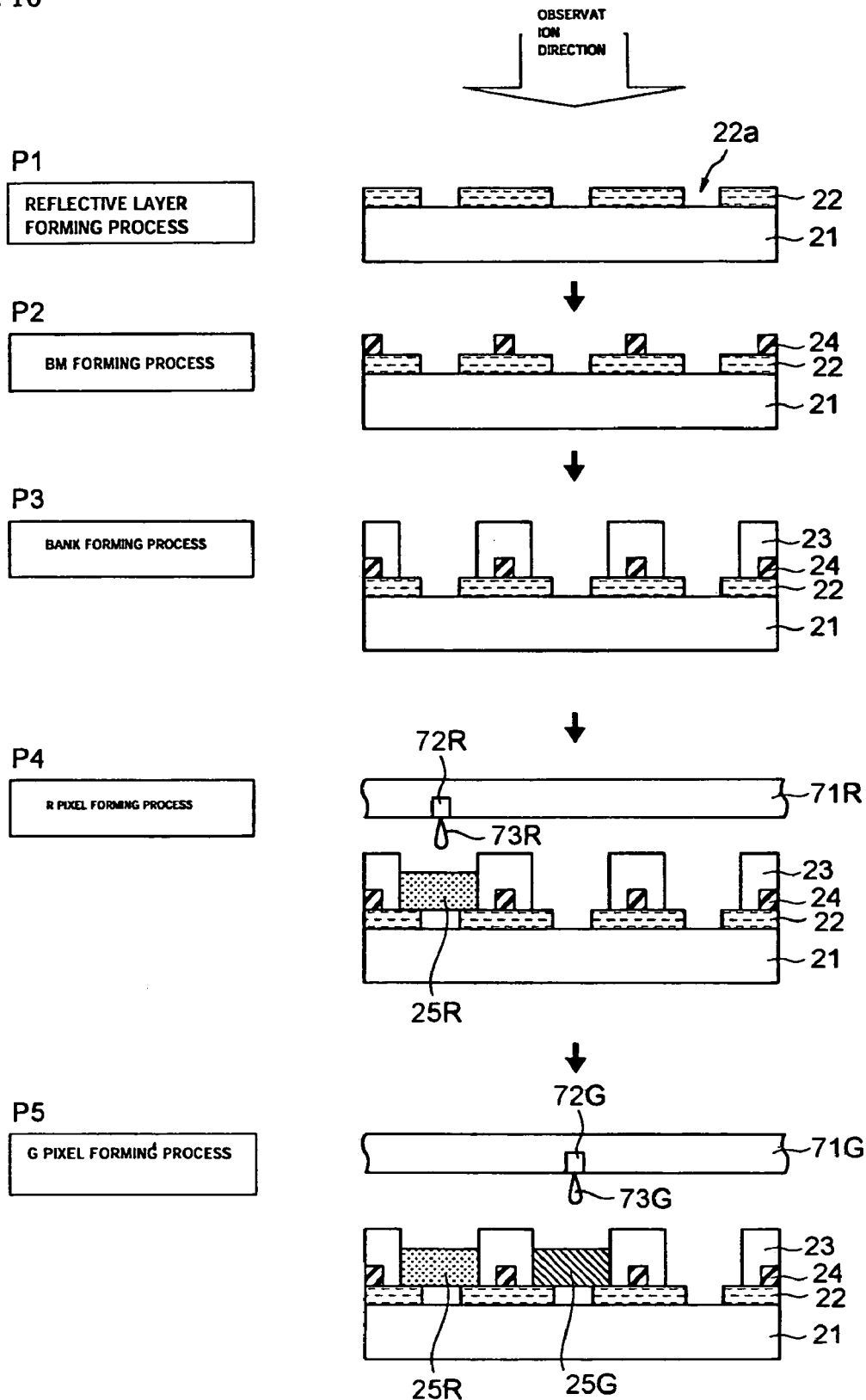
FIG. 10 is a process view of a first process of a manufacturing method of the color filter substrate of example 1.
Figure 11:
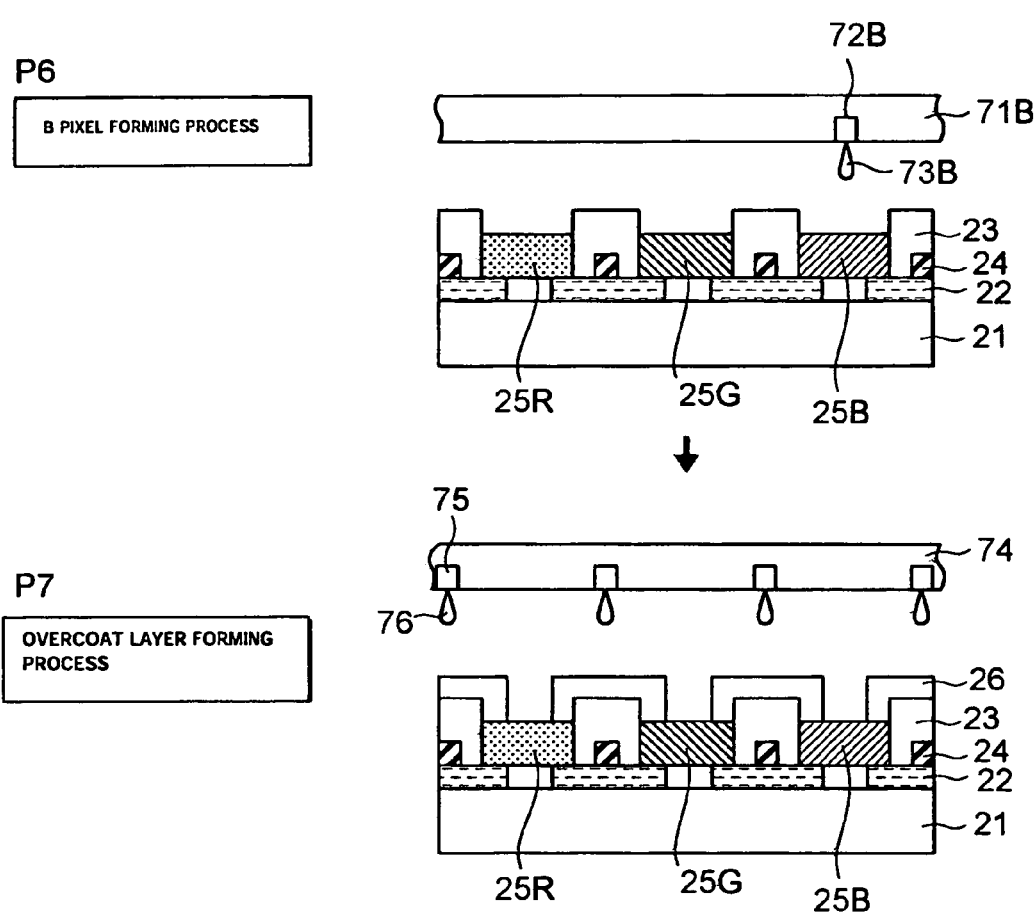
FIG. 11 is a process view of a second process of the manufacturing method of the color filter substrate of example 1.

FIGS. 10 and 11 are manufacturing process views of the color filter substrate.

To begin with, a film made of a metallic material, such as Al, is formed with a predetermined thickness on the glass substrate 21 by means of a sputtering method. Then, the Al film is patterned using a photolithography method, and a reflective layer 22, which is a lattice-shaped pattern as seen from an observation direction, is formed (Process P1). The reflective layer 22 has openings 22a that become the transmissive portions.

Next, the light-shielding layer 24 is formed (Process P2). Since the light-shielding layer 24 is provided to obtain a display screen having good contrast, and is formed in a lattice-shaped pattern in which parts corresponding to the respective dot portions are opened. The light-shielding layer 24 may be made of a metallic film, such as Cr (chromium), or may be made of a resin to which the pigment of black or color close to black is added.

Next, the bank layer 23 is formed. More specifically, an ink-repellent resin is coated with a predetermined thickness using a spin coating method, and is then patterned in a predetermined lattice shape using a suitable patterning technique, for example, a photolithography method (Process P3). At this time, the width of the bank layer 23 is smaller than the width of the respective layer 22.

Subsequently, a red colored layer 25R is formed within the respective regions divided by the bank layer 23 using an inkjet method (Process P4). More specifically, while an inkjet head 71R scans a surface of the substrate 21, a red colored layer material 73R is ejected as ink droplets at predetermined positions corresponding to an arrangement pattern from a nozzle 72R provided in an inkjet head 71R, and is attached to the substrate 21 and the reflective layer 22. Then, the red colored layer material 73R is hardened by means of a baking treatment, an ultraviolet ray curing treatment, or a vacuum drying treatment, such that the red colored layer 25R is formed.

Next, a green colored layer 25G is formed within the respective regions divided by the bank layer 23 using an inkjet method (Process P5). More specifically, while an inkjet head 71G scans a surface of the substrate 21, a green colored layer material 73G is ejected as ink droplets at predetermined positions corresponding to an arrangement pattern from a nozzle 72G provided in an inkjet head 71G, and is attached on the substrate 21 and the reflective layer 22. Then, the green colored layer material 73G is hardened by means of a baking treatment, an ultraviolet ray curing treatment, or a vacuum drying treatment, such that the green colored layer 25G is formed.

Next, a blue colored layer 25B is formed within the respective regions divided by the bank layer 23 using the inkjet method (Process P6). More specifically, while an inkjet head 71B scans a surface of the substrate 21, a blue colored layer material 73B is ejected as ink droplets at predetermined positions corresponding to an arrangement pattern from a nozzle 72B provided in an inkjet head 71B, and is attached on the substrate 21 and the reflective layer 22. Then, the blue colored layer material 73B is hardened by means of a baking treatment, an ultraviolet ray curing treatment or a vacuum drying treatment, such that the blue colored layer 25B is formed.

Subsequently, an overcoat layer 26 is formed on the colored layers 25 within the respective regions divided by the bank layer 23 using an inkjet method (Process P7). More specifically, similar to the colored layer forming process, an overcoat material 76 is ejected at predetermined positions from a nozzle 75 provided in an inkjet head 74, and is attached on the respective colored layers 25 on the substrate 21. Then, for example, the overcoat material 76 is hardened by means of a baking treatment at 200° C. for 30 to 60 minutes, such that the overcoat layer 26 is formed.

The overcoat layer 26 is patterned by a photolithography process, and is formed smaller than the thickness of a liquid crystal layer in the reflective region and the thickness of a liquid crystal layer in the transmissive region provided in the reflective layer 22, such that a so-called multi-gap type liquid crystal device can be formed.

Subsequently, a transparent conductive film made of ITO is formed on the overcoat layer 26 by means of a sputtering method, and is then patterned by means of a photolithography method, such that second transparent electrodes 27 are formed. Subsequently, the alignment film 28 made of a polyimide resin is formed on the second transparent electrodes 27, and a rubbing process is performed thereon. Thus, the color filter substrate 20 is manufactured.

Next, a method of manufacturing the liquid crystal device using the color filter substrate obtained as described above shown in FIG. 1 will be described.

To begin with, by means of the above-mentioned manufacturing method, the color filter substrate 20 according to any one of the above-mentioned examples is prepared. Meanwhile, in the case of the liquid crystal device 100, the first electrodes 2 and the alignment film 4 are formed on the substrate 1 opposite to the color filter substrate by means of a method similar to the method that forms the above-mentioned second electrodes 27 and the alignment film 28, such that the counter substrate 10 is prepared.

Then, a panel structure is constructed by bonding the color filter substrate 20 to the counter substrate 10 with the sealing material 53 having an opening portion interposed therebetween. The color filter substrate 20 and the counter substrate 10 are bonded to each other to have an almost regular substrate gap by means of spacers (not shown) that are dispersed between the substrates.

Subsequently, liquid crystal is injected through the opening portion of the sealing material 53, and then the opening portion of the sealing material is encapsulated by an end-sealing material, such as an ultraviolet ray curable resin. In such a manner, the liquid crystal panel 60 is manufactured. Subsequently, the polarizing plates 51 and 52 are bonded on the outer surfaces of the liquid crystal panel 60, and the backlight 40 is arranged, such that the liquid crystal device 100 shown in FIG. 1 is completed.

EXAMPLE 2

In the color filter substrate 20 of example 1, the light-shielding layer is provided, but similar to an example 2 descried below, a structure in which a light-shielding layer is not provided may be configured. The present example will now be described with reference to FIGS. 4 and 5, but the description of the same elements as those of example 1 will be omitted.

Figure 4:
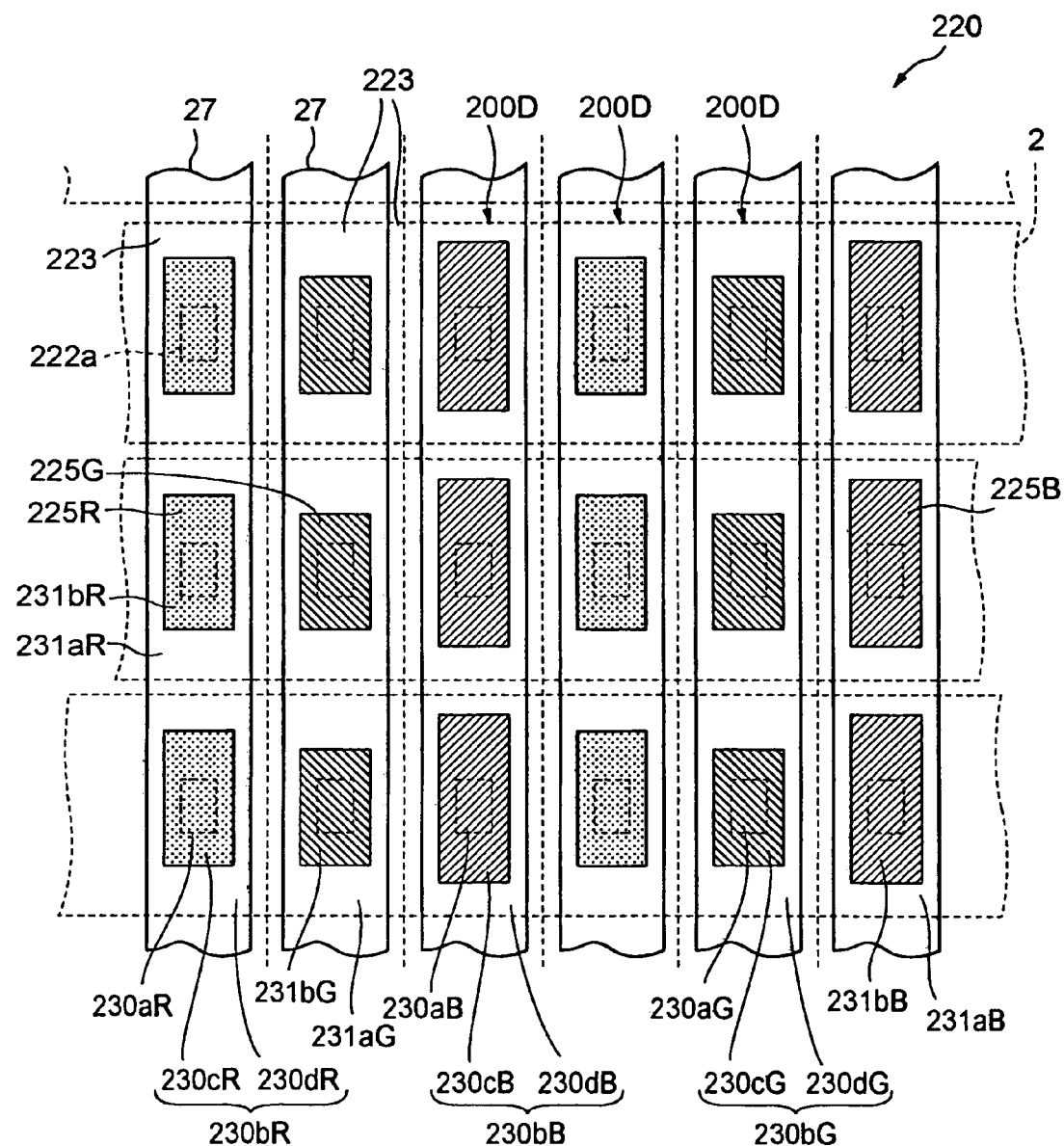
FIG. 4 is a partial plan view schematically illustrating a color filter substrate of example 2.

FIG. 4 is a partial schematic plan view of a color filter substrate in example 2. FIG. 5(a) is a partial schematic plan view of FIG. 4, which corresponds to one pixel. FIG. 5(b) is a cross-sectional view taken along the line B–B' of FIG. 5(a).

As shown in FIG. 4, a color filter substrate 220 includes a plurality of dot portions 200D. In the color filter substrate 220 of the present example, after it is incorporated into the liquid crystal device, regions that actually contribute to display correspond to the dot portions 200D. That is, in a state in which the color filter substrate is incorporated into the liquid crystal device, the dot portions 200D correspond to positions at which the first electrodes 2 and the second electrodes 27 overlap with each other in plan view. The respective dot portions 200D correspond to any one of R (red), G (green), and B (blue), and in the example of FIG. 4, the dot portions 200D having the same color are arranged in a vertical direction. In FIG. 4, one pixel is composed of three dot portions 200D of R, G, and B that are arranged repetitively in a horizontal direction.

Figure 5:
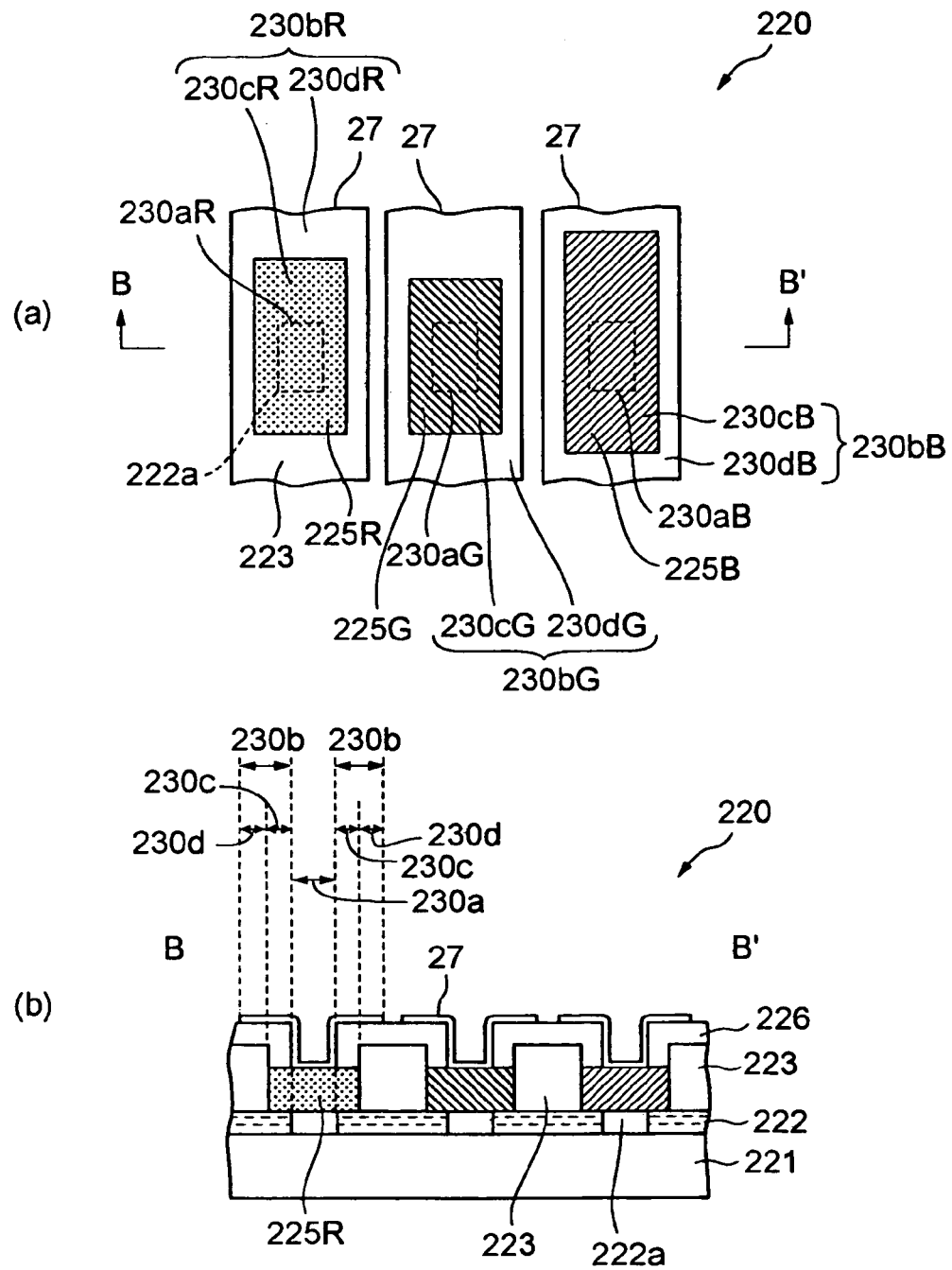
FIGS. 5(a) and 5(b) are a plan view and a cross-sectional view corresponding to one pixel in example 2.

As shown in FIGS. 4 and 5, the color filter substrate 220 is constructed by sequentially depositing a reflective layer 222, a bank layer 223 as a transparent layer, colored layers 225, an overcoat layer 226, second electrodes 27 made of a transparent material, such as ITO, and an alignment film (not shown) on a glass substrate 221. The reflective layer 222 is composed of a reflective film, such as an Al film.

Similar to example 1, the reflective layer 222 has reflective portions 222b and transmissive portions 222a, and the transmissive portions 222a are opening portions in which the reflective film, such as an Al film, is not formed. The opening portions that become the transmissive portions 222a are formed in every dot portion 200D. The bank layers 223 divide almost all of the dot portions 200D. Within regions surrounded by adjacent bank layers 223, any one of R, G, and B colored layers 225 is formed by means of the ink-jet method.

The respective dot portions 200D have a bank layer forming region 231a as a transparent layer region made of a frame-shaped bank layer 223 and a colored layer region 231b which is constructed by arranging the colored layer 225 within the bank layer region 231a. Further, the respective dot portions 200D have a transmissive region 230a to be used for a transmissive display and a reflective region 230b. The reflective region 230b has a colored layer region 230c in which the colored layer is arranged and a bank layer region 230d in which a transparent bank layer is arranged. In the respective dot portions 200D, in the transmissive region 230a, only the colored layer 225 is arranged, and in the reflective region 230b, the colored layer 225 and the bank layer 223 are arranged.

In the present example, planar forming areas of the respective dot portions 200D corresponding to the respective colors and planar forming areas of the transmissive regions 230a (that is, the transmissive portions 222a of the reflective layer 222) are the same respectively. In the respective dot portions 200D, planar forming areas of the respective bank layer forming regions 231a are different from each other for the respective colors. Specific numeric values are the same as those of the first example, and the description thereof will be omitted.

Like the present example, the light-shielding layer may be not provided. In this case, similarly to example 1, it is also possible to obtain a color filter substrate that has a chromaticity property exhibiting a good white balance. Thus, a transflective liquid crystal device comprising such a color filter substrate has a luminous reflective display property.

In manufacturing the color filter substrate described in example 2, the manufacturing method of the color filter substrate described in the above-mentioned example 1 can be applied. That is, in a manufacturing method of the color filter substrate in example 2, the light-shielding layer forming process may be omitted. Further, by using the same method as the manufacturing method of the liquid crystal device described in example 1, it is possible to obtain a liquid crystal device into which the color filter substrate of example 2 is incorporated.

EXAMPLE 3

In the above-mentioned examples, the planar shapes of the bank layer regions in the dot portions are in a frame shape, but similar to a color filter substrate of an example 3 described below, the planar shapes of the bank layer regions in the dot portions may be in an island shape. The present example will now be described with reference to FIGS. 6 and 7, but the description of the same elements as those of example 1 will be omitted.

Figure 6:
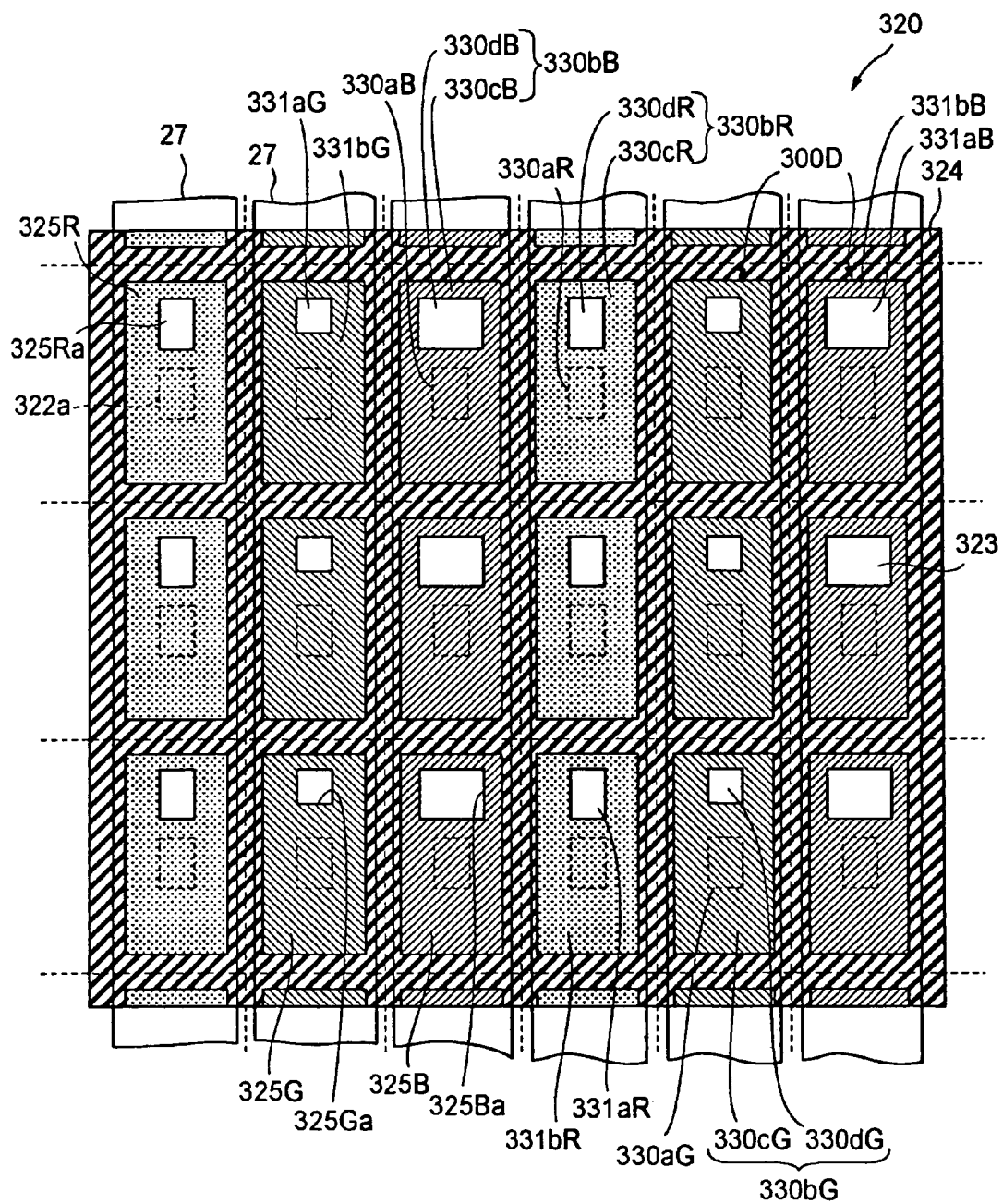
FIG. 6 is a partial plan view schematically illustrating a color filter substrate of example 3.

FIG. 6 is a partial schematic plan view of a color filter substrate in an example 3. FIG. 7(a) is a partial schematic plan view of FIG. 6, which corresponds to one pixel. FIG. 7(b) is a cross-sectional view taken along the line C–C' of FIG. 7(a), and FIG. 7(c) is a cross-sectional view taken along the line D–D' of FIG. 7(a).

As shown in FIG. 6, the color filter substrate 320 includes a plurality of dot portions 300D. In the present example, as seen from a direction orthogonal to the substrate, the liquid crystal device into which the color filter substrate 320 of the present example is configured such that an end of each of the intersecting portions in which the first electrodes 2 and the second electrodes 27 overlap with each other in plan view is disposed on the light-shielding layer 324. Therefore, in the respective dot portions 300D, regions that actually contribute to display are regions which are divided by the light-shielding layer 324, and in the present example, the regions which actually contribute to display correspond to the dot portions 300D.

The respective dot portions 300D have a transmissive region 330a and a reflective region 330b. The reflective region 330b has a colored layer region 330c in which a colored layer is arranged and a bank layer region 330d as a transparent layer region in which a transparent bank layer is arranged. The transmissive region 330a corresponds to the transmissive portion 322a of the reflective layer 322, and the reflective region 330b corresponds to the reflective portion 322b of the reflective layer 322. The respective dot portions 300D correspond to any one of R (red), G (green), and B (blue), and in the example of FIG. 6, the dot portions 300D having the same color are arranged in a vertical direction. In FIG. 6, one pixel is composed of three dot portions 300D of R, G, and B arranged in a horizontal direction.

Figure 7:
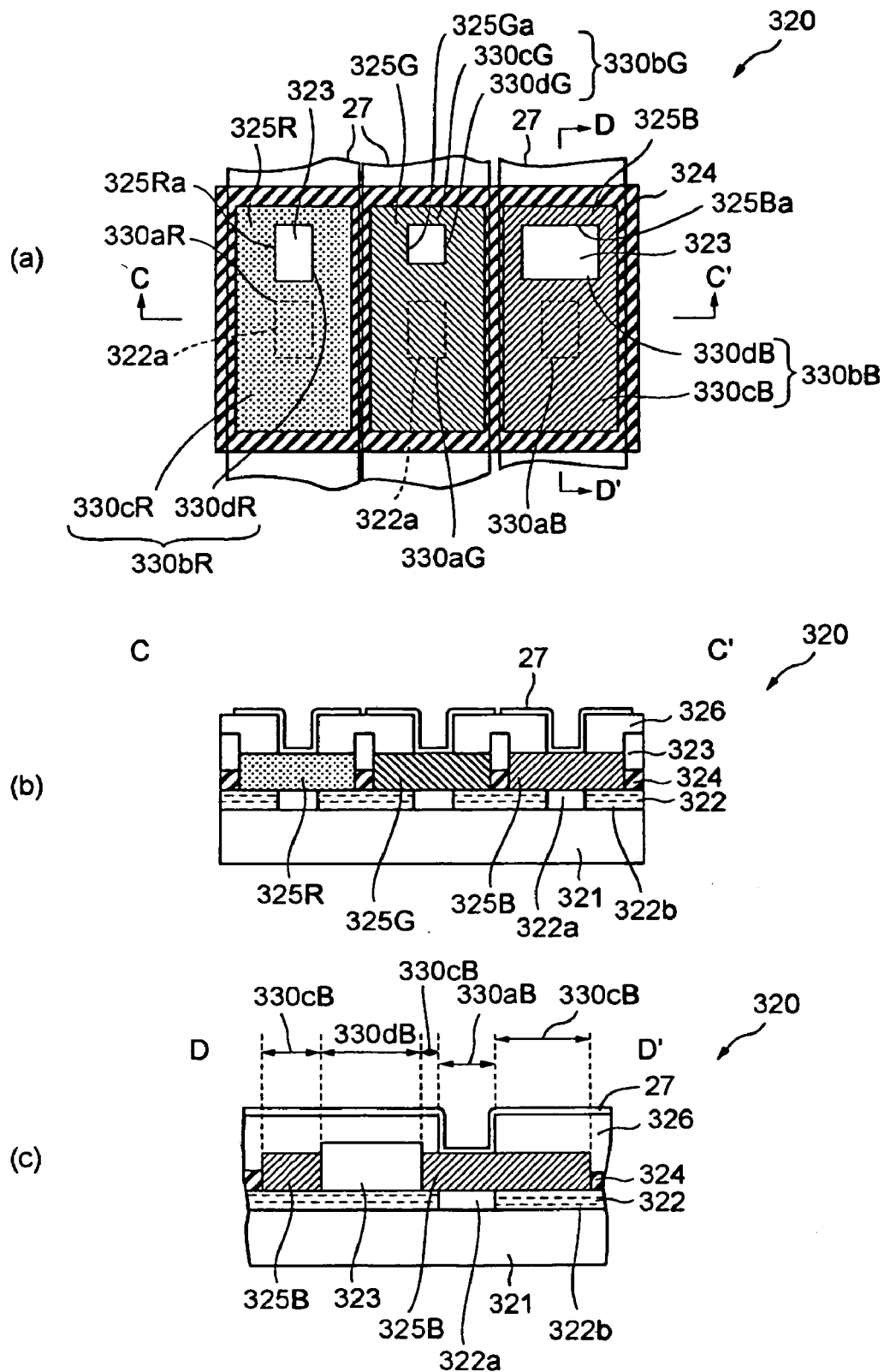
FIGS. 7(a) to 7(c) are a plan view and cross-sectional views corresponding to one pixel in example 3.

As shown in FIGS. 6 and 7, the color filter substrate 320 is constructed by sequentially depositing a reflective layer 322, a light-shielding layer 324, a bank layer 323 as a transparent layer, colored layers 325, an overcoat layer 326, second electrodes 27 made of a transparent material, such as ITO, and an alignment film (not shown) on a glass substrate 321. The reflective layer 322 is composed of a reflective film, such as an Al film. The light-shielding layer 324 is formed in a lattice shape so as to divide the dot portions.

The reflective layer 322 has reflective portions 322b and transmissive portions 322a, the transmissive portions 322a are opening portions in which the reflective film, such as an Al film, is not formed, and the opening portions which become the transmissive portions 322a are formed in every dot portion 300D. The bank layer 323 is formed in a lattice shape on the light-shielding layer 324 so as to entirely overlap with the light-shielding layer 324 in plan view, and further is formed in accordance with a part (a bank layer region 330*d*) of the reflective regions 330*b* of the respective dot portions 300D. In other words, the bank layer 323 is formed in a lattice shape so as to divide the dot portions, and further is formed in an island shape for every dot portion. Within a region surrounded by the bank layer 323 arranged on the light-shielding layer 324, any one colored layer 325 of R, G, and B is formed by means of an inkjet method described below. A region corresponding to the transmissive portion 322*a* of the colored layer region 331*b* is the transmissive region 330*a* to be used for the transmissive display, and the remaining parts of the colored layer region 331*b* and the bank layer region 331*a* correspond to the reflective region 330*b* to be used for the reflective display. That is, in the transmissive region 330*a*, only the colored layer 325 is arranged, and in the reflective region 330*b*, the colored layer 325 and the bank layer 323 are arranged. In the present example, the planar forming areas of the respective dot portions 300D corresponding to the respective colors and the planar forming areas of the transmissive regions 330*a* (that is, the transmissive portions 322*a* of the reflective layer 322) are respectively the same, and the planar forming areas of the bank layer regions 331*a* in the respective dot portions 300D are different from each other for the respective colors. Specific numeric values are the same as those of example 1, and the description thereof will be omitted.

Like the present example, the planar shapes of the bank layer regions of the respective dot portions may be in an island shape. In this case, similarly to example 1, it is also possible to obtain a color filter substrate which has a chromaticity property exhibiting a good white balance. Thus, a transflective liquid crystal device comprising such a color filter substrate has a luminous reflective display property.

Moreover, the planar shapes of the bank layer regions are not limited to the above-mentioned example, but may be changed voluntarily.

In manufacturing the color filter substrate described in example 3, the manufacturing method of the color filter substrate described in the above-mentioned example 1 can be applied. That is, in a manufacturing method of the color filter substrate in example 3, the pattern shape of the bank layer may be changed. Further, by using the same method as the manufacturing method of the liquid crystal device described in example 1, it is possible to obtain a liquid crystal device into which the color filter substrate of example 3 is incorporated.

EXAMPLE 4

In the above-mentioned examples, the planar areas of the transmissive portions are the same for every color, but similar to a color filter substrate of an example 4 described below, the planar areas of the transmissive portions of the reflective layer may be different from each other. The present example will now be described with reference to FIG. 8, and the description of the same elements as those of example 1 will be omitted.

Figure 8:
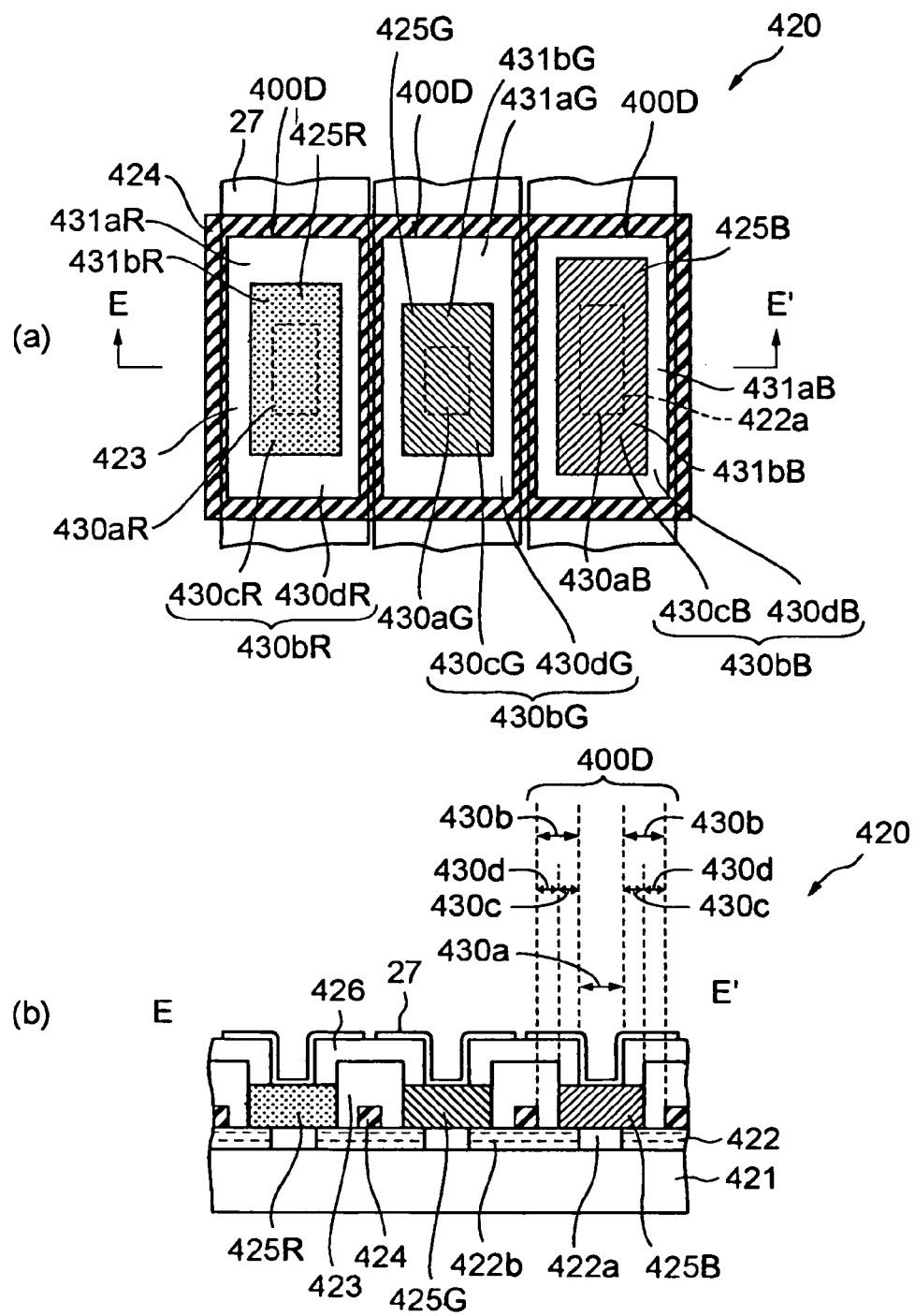
FIGS. 8(a) and 8(b) are a plan view and a cross-sectional view corresponding to one pixel in example 4.

FIG. 8(*a*) is a partial schematic plan view of a color filter substrate in example 4, which corresponds to one pixel. FIG. 8(*b*) is a cross-sectional view taken along the line E–E' of FIG. 8(*a*).

As shown in FIG. 8, a color filter substrate 420 includes a plurality of dot portions 400D. In the present example, as seen from a direction orthogonal to the substrate, the liquid crystal device into which the color filter substrate 420 of the present example is configured such that an end of each of intersecting portions in which the first electrodes 2 and the second electrodes 27 overlap with each other in plan view is disposed on the light-shielding layer 424. Therefore, in the respective dot portions 400D, regions that actually contribute to display are regions which are divided by the light-shielding layer 424, and in the present example, the regions which actually contribute to display correspond to the dot portions 400D. The respective dot portions 400D have a transmissive region 430*a* and a reflective region 430*b*. The reflective region 430*b* has a colored layer region 430*c* in which a colored layer is arranged and a bank layer region 430*d* as a non-colored region in which a transparent bank layer is arranged. The transmissive region 430*a* corresponds to the transmissive portion 422*a* of the reflective layer 422, and the reflective region 430*b* corresponds to the reflective portion 422*b* of the reflective layer 422. The respective dot portions 400D correspond to any one of R (red), G (green), and B (blue), and one pixel is composed of three dot portions 400D of R, G, and B.

The color filter substrate 420 is constructed by sequentially depositing a reflective layer 422, a light-shielding layer 424, a bank layer 423 as a transparent layer, colored layers 425, an overcoat layer 426, second electrodes 27 made of a transparent material, such as ITO, and an alignment film (not shown) on a glass substrate 421. The reflective layer 422 is composed of a reflective film, such as an Al film. The light-shielding layer 424 is formed in a lattice shape so as to divide the dot portions 400D.

The reflective layer 422 has reflective portions 422*b* and transmissive portions 422*a*. The transmissive portions 422*a* are opening portions in which the reflective film, such as an Al film, is not formed, and the opening portions which become the transmissive portions 422*a* are formed in every dot portion 400D. The bank layer 423 is formed to have a width wider than that of the light-shielding layer 424 and to cover the light-shielding layer 424. Within a region surrounded by the bank layer 423, any one colored layer 425 of R, G and B is formed by means of an inkjet method described below. A region corresponding to the transmissive portion 422*a* of the colored layer region 431*b* is the transmissive region 430*a* to be used for the transmissive display, and the remaining parts of the colored layer region 431*b* and the bank layer region 431*a* is the reflective region 430*b* to be used for the reflective display. That is, in the transmissive region 430*a*, only the colored layer 425 is arranged, and in the reflective region 430*b*, the colored layer 425 and the bank layer 423 are arranged.

In the present example, the planar forming areas of the respective dot portions 400D corresponding to the respective colors are the same. The planar forming areas of the transmissive portions 422*a* (that is, the transmissive regions 430*a*) of the reflective layer 422 and the planar forming areas of the bank layer regions 431*a* in the respective dot portions 400D are different from each other for the respective colors. More specifically, in the dot portions, the ratio of the forming areas of the transmissive portions 422*a* is red:green:blue=1 to 1.2:1:1 to 1.5, and the ratio of the forming areas of the bank layer regions 431*a* is red:green: blue=1.1 to 1.3:1.3 to 2.5:1.

Like the present example, the respective ratios of the planar areas of the bank layer regions 431*a* and the colored layer regions 431*b* in the respective reflective portions 422*b* are different from each other, such that it is possible to change a color balance in the reflective display. Further, by setting the respective ratios of the planar areas of the bank layer regions 431*a* and the colored layer regions 431*b* corresponding to the reflective portions 422*b* as described above, in the reflective display, it is possible to obtain the optimum luminosity for every color, and further it is possible to obtain a color filter substrate which has a chromaticity property exhibiting a good white balance. Thus, a transflective liquid crystal device comprising such a color filter substrate has a luminous reflective display property.

In addition, the ratio of the planar areas of the transmissive portions 422*a* of the reflective layer are made different from each other, such that it is possible to adjust the amount of light from the backlight 40 in the transmissive display, and further it is possible to change the color balance in the transmissive display. Further, by setting the planar areas of the transmissive portions 422*a* as described above, it is possible to obtain a color filter substrate having an optimum color balance in the transmissive display. In addition, a transflective liquid crystal panel comprising such a color filter substrate has a transmissive display property exhibiting an excellent color balance.

As described above, the respective ratios of the bank layer regions 431*a* and the colored layer regions 431*b* corresponding to the reflective portions 422*b* are different from each other for the respective colors, and then the planar areas of the transmissive portions 422*a* are different from each other. Accordingly, it is possible to change a color balance in the transmissive display and the reflective display, respectively. Therefore, when the optimum color balances in the reflective display and the transmissive display are different from each other, it is possible to set an optimum color balance in the reflective display and the transmissive display by changing the color balances of the reflective display and the transmissive display.

In manufacturing the color filter substrate described in example 4, the manufacturing method of the color filter substrate described in the above-mentioned example 1 can be applied. That is, in example 4, the pattern of the reflective layer and the pattern of the bank layer may be changed. Further, with the same method as the manufacturing method of the liquid crystal device described in example 1, it is possible to obtain a liquid crystal device into which the color filter substrate of example 4 is incorporated.

EXAMPLE 5

In example 4, the bank layer is arranged in the non-colored regions, and the colored layers are formed by means of the inkjet method, but like the present example, the bank layer may be not formed and the colored layers may be formed by means of, for example, a photolithography method. Moreover, in the present example, similarly to example 4, the planar areas of the transmissive portions and the planar areas of the non-colored regions are different from each other respectively, and thus the description of the same elements as those of example 4 will be omitted. The present example will now be described with reference to FIG. 9.

Figure 9:
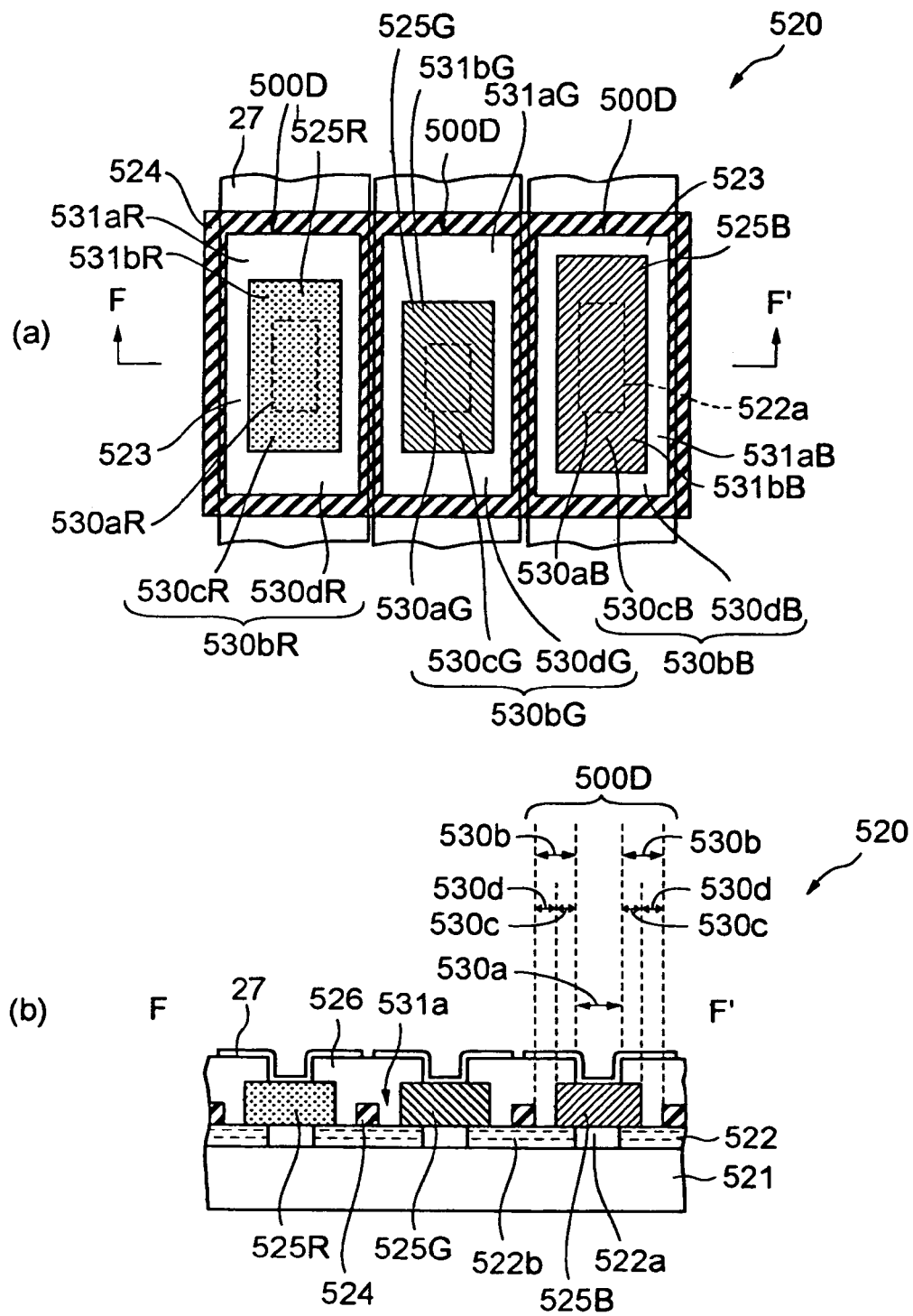
FIGS. 9(a) and 9(b) are a plan view and a cross-sectional view corresponding to one pixel in example 5.

FIG. 9(*a*) is a partial schematic plan view of a color filter substrate in an example 5, which corresponds to one pixel. FIG. 9(*b*) is a cross-sectional view taken along the line F–F' of FIG. 9(*a*).

As shown in FIG. 9, a color filter substrate 520 includes a plurality of dot portions 500D. In the present example, as seen from a direction orthogonal to the substrate, the liquid crystal device into which the color filter substrate 520 of the present example is configured such that an end of each of intersecting portions in which the first electrodes 2 and the second electrodes 27 overlap with each other in plan view is disposed on the light-shielding layer 524. Therefore, in the respective dot portions 500D, regions that actually contribute to display are regions which are divided by the light-shielding layer 524, and in the present example, the regions which actually contribute to display correspond to the dot portions 500D.

The respective dot portions 500D have a transmissive region 530*a* and a reflective region 530*b*. The reflective region 530*b* has a colored layer region 530*c* in which a colored layer is arranged and a non-colored region 530*d*. The transmissive region 530*a* corresponds to the transmissive portion 522*a* of the reflective layer 522, and the reflective region 530*b* corresponds to the reflective portion 522*b* of the reflective layer 522. The respective dot portions 500D correspond to any one of R (red), G (green), and B (blue), and one pixel is composed of three dot portions 500D of R, G, and B.

The color filter substrate 520 is constructed by sequentially depositing a reflective layer 522, a light-shielding layer 524, colored layers 525, an overcoat layer 526, second electrodes 27 made of a transparent material, such as ITO, and an alignment film (not shown) on a glass substrate 521.

The reflective layer 522 is composed of a reflective film, such as an Al film. The reflective layer 522 has reflective portions 522*b* and transmissive portions 522*a*, the transmissive portions 522*a* are opening portions in which the reflective film, such as an Al film, is not formed, and the opening portions which become the transmissive portions 522*a* are formed in every dot portion 500D.

The light-shielding layer 524 is formed in a lattice shape so as to divide the dot portions 500D. The colored layers 525 are formed in an island shape located at a constant distance from the light-shielding layer 524. The colored layer 525 is formed by means of, for example, a known photolithography method. The respective dot portions 500D have a colored layer region 531*b* in which the colored layer 525 is formed and a non-colored layer region 531*a* in which the colored layer 525 is not formed. Further, the overcoat layer 526 is formed to fill up the non-colored regions 531*a*.

A region corresponding to the transmissive portion 522*a* of the colored layer region 531*b* is the transmissive region 530*a* to be used for the transmissive display. The remaining parts of the colored layer region 531*b* and the non-colored layer region 531*a* correspond to the reflective portion 530*b* to be used for the reflective display. That is, in the transmissive region 530*a*, only the colored layer 525 is arranged, and in the reflective region 530*b*, the colored layer 525 and the overcoat layer 526 are arranged.

In the present example, the planar areas of the respective dot portions 500D corresponding to the respective colors are the same, and the planar forming areas of the transmissive portions 522*a* (that is, the transmissive regions 530*a*) of the reflective layer 522 and the planar forming areas of the non-colored layer regions 531*a* of the respective dot portions 500D are different from each other for the respective colors. Since specific numeric values are the same as those of example 4, the description thereof will be omitted.

As described above, the present invention can be applied to a structure in which a bank layer is not formed, that is, even when the colored layers are formed without using the inkjet method. Further, like example 4, the planar areas of the non-colored layer regions 531*a* in the reflective portions 522*b* are different from each other for the respective colors, and then the planar forming areas of the transmissive portions 530*a* are different from each other for the respective colors, such that it is possible to change a color balance in the transmissive display and the reflective display. Therefore, when the optimum color balances in the reflective display and the transmissive display are different from each other, it is possible to set an optimum color balance in the reflective display and the transmissive display by changing the color balances of the reflective display and the transmissive display.

Figure 12:
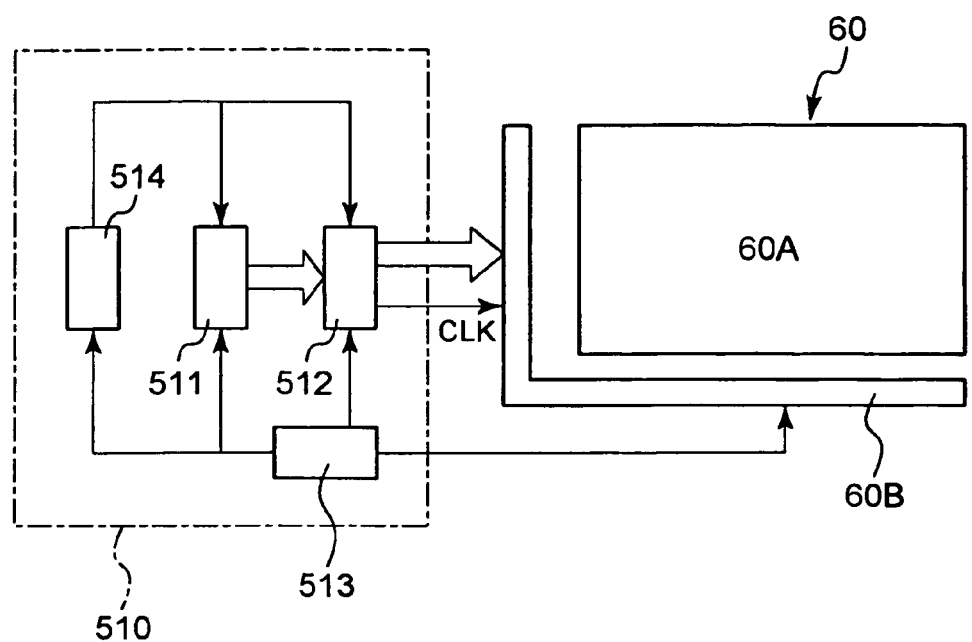
FIG. 12 is a block diagram showing the configuration of an electronic apparatus of the present invention.

Next, an example in which a liquid crystal panel using the color filter substrate according to the present invention is used as a display device of an electronic apparatus will be described. FIG. 12 is a schematic diagram showing the entire configuration of the present example. An electronic apparatus shown in FIG. 12 has the above-mentioned liquid crystal panel 60 and a control means 510 for controlling the liquid crystal panel 60. Herein, the liquid crystal panel 60 is conceptually divided into a panel structure 60A and a driving circuit 60B composed of a semiconductor IC and the like. Further, the control means 510 has a display information output source 511, a display information processing circuit 512, a power source circuit 513, and a timing generator 514.

The display information output source 511 is composed of a memory, such as a ROM (Read Only Memory) or a RAM (Random Access Memory), a storage unit, such as a magnetic recording disk or an optical recording disk, and a tuning circuit for tuning and outputting digital image signals, and is configured to supply display images to the display information processing circuit 512 in a predetermined format of image signals, based on various clock signals generated by the timing generator 514.

The display information processing circuit 512 comprises various known circuits, such as a serial to parallel converting circuit, an amplifying and inverting circuit, a rotation circuit, a gamma correction circuit, and a clamp circuit. The display information processing circuit 512 processes input display information to supply the processed display information to the driving circuit 60B, together with a clock signal CLK. The driving circuit 60B comprises a driving circuit for driving the respective wiring lines in the liquid crystal panel and a test circuit. Further, the power source circuit 513 supplies a predetermined voltage to the above-mentioned elements.

Figure 13:
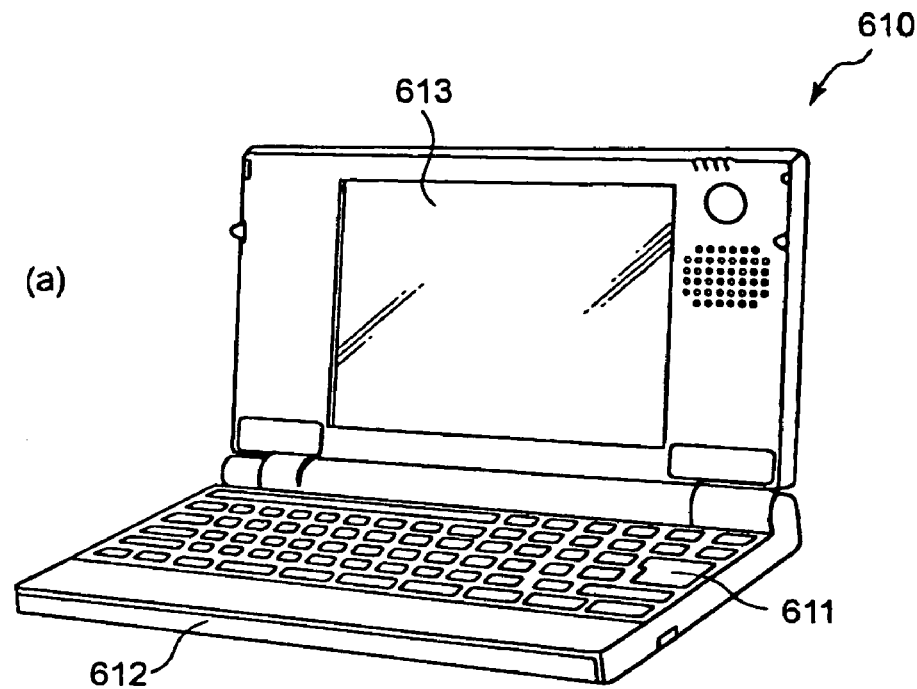
FIG. 13 is a perspective view showing appearances of a personal computer and a cellular phone.
Figure 13:
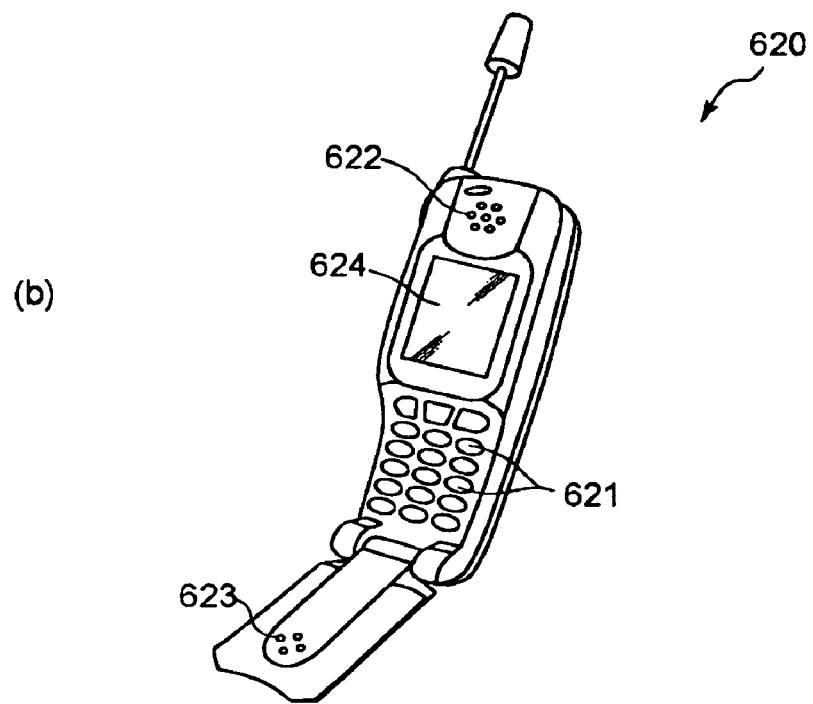

Next, an example in which a liquid crystal device according to the present invention is applied to a display unit of a portable personal computer (a so-called notebook computer) will be described. FIG. 13(a) is a perspective view showing the configuration of the personal computer. As shown in FIG. 13(a), the personal computer 610 comprises a main body 612 provided with a keyboard 611 and a display unit 613 to which a liquid crystal device according to the present invention is applied.

Subsequently, an example in which a liquid crystal device according to the present invention is applied to a display unit of a cellular phone will be described. FIG. 13(b) is a perspective view showing the configuration of the cellular phone. As shown in FIG. 13(b), a cellular phone 620 comprises, other than a plurality of scanning buttons 621, a display unit 624 to which a liquid crystal device according to the present invention is applied, in addition to a receiving port 622 and a transmitting port 623.

Moreover, an electronic apparatus to which a liquid crystal device according to the present invention can be applied includes a liquid crystal television, a view finder type or monitor-direct-view type video tape recorder, a car navigation device, a pager, an electronic organizer, an electronic calculator, a word processor, a workstation, a videophone, a POS terminal, and a digital still camera.

Further, the electro-optical device according to the present invention can be applied to an active matrix liquid crystal device (for example, a liquid crystal panel comprising TFTs or TFDs as switching elements) as well as a simple matrix liquid crystal device. For example, in a transflective liquid crystal device using TFTs, a transflective substrate on which a reflective layer, TFTs and so on are formed and a color filter electrode substrate on which colored layers are formed are bonded to each other, and a backlight is provided on the transflective substrate side. In such a manner, the present invention can be applied to a case in which the reflective layer and the colored layers are formed on the respective substrates. Further, planar areas of bank layer forming regions or non-colored regions on the color filter electrode substrate are different from each other, such that it is possible to obtain an electro-optical device having a good color property.

What is claimed is:

1. An electro-optical device comprising:
    colored layers having plural colors provided in correspondence with a plurality of dot portions;
    a reflective layer overlapping the colored layers in plan view; and
    transparent layers provided in correspondence with the plurality of dot portions, the transparent layers each surrounding a corresponding colored layer in plan view,
    the transparent layers in the dot portions having areas which are different from each other such that the colored layer for each color in the dot portions has a different area.

2. The electro-optical device according to claim 1, wherein the colored layers comprise a droplet material.

3. The electro-optical device according to claim 1, wherein the dot portions include transmissive portions and reflective portions, and the reflective layer is disposed in the reflective portions; and
    wherein the colored layers are arranged in the transmissive portions, and the transparent layers and the colored layers are arranged in the respective reflective portions.

4. The electro-optical device according to claim 3, wherein the colored layers comprise red, green, and blue colored layers, and wherein a ratio of the areas of the respective transparent layers in the dot portions is: red:green:blue=1.1 to 1.3:1.3 to 2.5:1.

5. An electro-optical device comprising:
    colored layers having a plurality of colors provided in correspondence with a plurality of dot portions;
    a reflective layer overlapping the colored layers in plan view; and
    transmissive portions and reflective portions for the dot portions, the reflective layer being formed in the reflective portions;
    wherein the dot portions have colored layer regions provided with the colored layers and non-colored regions free of the colored layers, the non-colored regions having transparent layers disposed therein, the transparent layers each surrounding a corresponding colored layer;
    wherein the colored layer regions are arranged in the transmissive portions of the dot portions, and corresponding non-colored regions and the colored layer regions are arranged in the reflective portions of the dot portions; and
    wherein the non-colored regions in the respective dot portions have areas which are different from each other for each color of the colored layers.

6. The electro-optical device according to claim 5, wherein the transmissive portions have areas that are different from each other for each color of the colored layers.

7. The electro-optical device according to claim 6, wherein the colored layers comprise red, green and blue colored layers, and
wherein a ratio of the areas of the transmissive portions is: red:green:blue=1 to 1.2:1:1 to 1.5.

8. A color filter substrate comprising:
colored layers having plural colors provided in correspondence with a plurality of dot portions;
a reflective layer overlapping the colored layers in plan view; and
transparent layers provided in correspondence with the plurality of dot portions, the transparent layers each surrounding a corresponding colored layer in plan view,
the transparent layers in the dot portions having areas that are different from each other such that the colored layers for each color in the dot portions has a different area.

9. The color filter substrate according to claim 8, further comprising a reflective layer overlapping the colored layers in plan view.

10. A color filter substrate comprising:
colored layers having plural colors provided in correspondence with a plurality of dot portions;
a reflective layer overlapping the colored layers in plan view; and
transmissive portions and reflective portions in which the reflective layer is formed for the respective dot portions,
wherein the dot portions have colored layer regions in which the colored layers are provided and non-colored regions in which the colored layers are not provided, the non-colored regions having transparent layers disposed therein, the transparent layers each surrounding a corresponding colored layer,
wherein the colored layer regions are arranged in the transmissive portions of the dot portions, and the corresponding non-colored regions and the colored layer regions are arranged in the reflective portions of the dot portions, and
wherein the non-colored regions in the dot portions have areas that are different from each other for each color of the colored layers.

11. An electronic apparatus comprising the electro-optical device according to claim 1.

* * * * *